9797X
A. Wood,
Rocking Chair,
Patented June 28, 1836
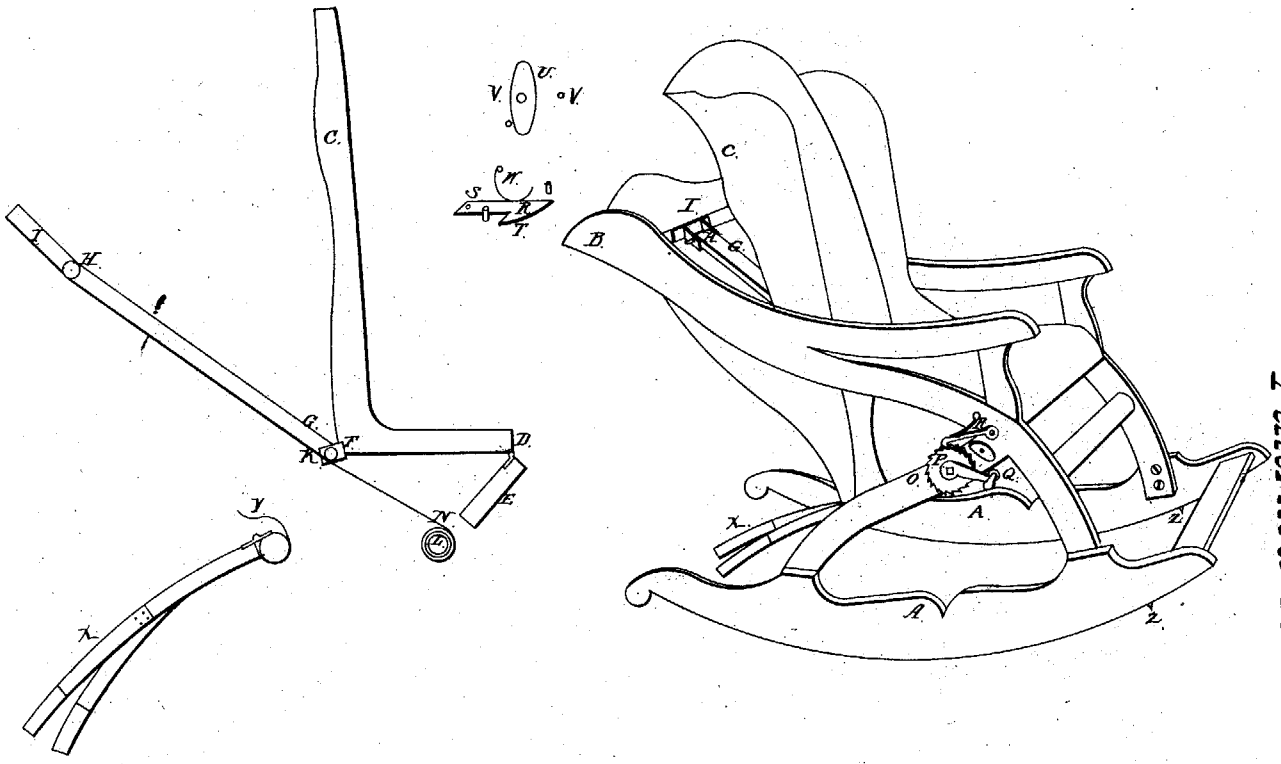
N. PETERS, PHOTO-LITHOGRAPHER, WASHINGTON, D. C.

6/28/1836 9797X

Andrew Woods June 28. 1836

[illegible]

[illegible]

6/28/1836 9797x crank handle Q. The catch R of the Ratchet turns on
a pin S inserted in the [illegible]
[illegible]
as to allow [illegible] of its being [illegible]
[illegible]
in the side of the rail [illegible]
staple V inserted in the [illegible] spring [illegible]
the back of the catch [illegible]
[illegible]
X [illegible] the [illegible] of the [illegible]
[illegible]
[illegible]
there to hold the [illegible]
[illegible] spring Y [illegible]
Z may be inserted in the [illegible]
[illegible]
When the [illegible]
[illegible]

6/28/1836 9797X press upon the bevelled end of the Catch and force it
out of the way, the ratchet wheel and axle being thus
free the [illegible] of the [illegible]
[illegible] What I
[illegible]
[illegible] Letters Patent [illegible]
[illegible] particularly [illegible]
and the [illegible]
[illegible]
[illegible]
[illegible]
[illegible] in the same principle Witness[illegible] [illegible]
[illegible]
Benj. [illegible]

790 [illegible] (Patented [illegible] 28. 1836)

[illegible]